(12) United States Patent
Halter et al.

(10) Patent No.: US 10,747,585 B2
(45) Date of Patent: Aug. 18, 2020

(54) METHODS AND APPARATUS TO PERFORM DATA MIGRATION IN A DISTRIBUTED ENVIRONMENT

(71) Applicant: VMware Inc., Palo Alto, CA (US)

(72) Inventors: Bryan Halter, Burlington, MA (US); Alexey Grunkov, Burlington, MA (US); Paul Howes, Burlington, MA (US); Miroslav Mitevski, Sofia (BG); Madhavi Koganti, Austin, TX (US)

(73) Assignee: VMware Inc., Palo Alto, CA (US)

( * ) Notice: Subject to any disclaimer, the term of this patent is extended or adjusted under 35 U.S.C. 154(b) by 171 days.

(21) Appl. No.: 15/607,025

(22) Filed: May 26, 2017

(65) Prior Publication Data

US 2018/0343300 A1    Nov. 29, 2018

(51) Int. Cl.
*G06F 9/50* (2006.01)
*G06F 16/21* (2019.01)
*H04L 29/08* (2006.01)
*G06F 9/48* (2006.01)
*G06F 16/27* (2019.01)

(52) U.S. Cl.
CPC .......... *G06F 9/5088* (2013.01); *G06F 16/214* (2019.01); *G06F 9/4856* (2013.01); *G06F 16/27* (2019.01); *H04L 67/1095* (2013.01); *H04L 67/1097* (2013.01)

(58) Field of Classification Search
CPC .... H04L 67/108; H04L 67/1095; G06F 16/27

USPC ......................................................... 709/226
See application file for complete search history.

(56) References Cited

U.S. PATENT DOCUMENTS

| | | | | |
|---|---|---|---|---|
| 2014/0146055 | A1* | 5/2014 | Bala | G06F 11/1402 |
| | | | | 345/501 |
| 2014/0149494 | A1* | 5/2014 | Markley | H04L 67/34 |
| | | | | 709/203 |
| 2014/0149591 | A1* | 5/2014 | Bhattacharya | H04L 67/1097 |
| | | | | 709/226 |
| 2015/0319160 | A1* | 11/2015 | Ferguson | H04L 9/0894 |
| | | | | 726/10 |
| 2015/0370871 | A1* | 12/2015 | Bender | G06F 16/254 |
| | | | | 707/602 |
| 2016/0210195 | A1* | 7/2016 | Sinha | G06F 16/188 |
| 2016/0294794 | A1* | 10/2016 | Mancic | H04L 63/061 |
| 2017/0286523 | A1* | 10/2017 | Lee | G06F 16/1824 |
| 2017/0364345 | A1* | 12/2017 | Fontoura | G06F 8/65 |
| 2018/0091625 | A1* | 3/2018 | Hwang | H04L 67/34 |

* cited by examiner

*Primary Examiner* — Minh Chau Nguyen
(74) *Attorney, Agent, or Firm* — Hanley, Flight & Zimmerman, LLC

(57) ABSTRACT

Methods and apparatus to perform data migration in a distributed cloud management automater are disclosed. An example apparatus includes a source data generator to generate a migration package corresponding to a source cloud management automater; a target cloud management automater migrator to migrate data of the migration package into a target cloud management automater; and performing a schema upgrade of a target database of the target cloud management automater; and a target service upgrader to upgrade service components at the target cloud management automater based on the migration package.

21 Claims, 6 Drawing Sheets

METHODS AND APPARATUS TO PERFORM DATA MIGRATION IN A DISTRIBUTED ENVIRONMENT

FIELD OF THE DISCLOSURE

The present disclosure relates generally to cloud computing and, more particularly, to methods and apparatus to perform data migration in a distributed environment.

BACKGROUND

Virtualizing computer systems provides benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

DETAILED DESCRIPTION

Figure 1:
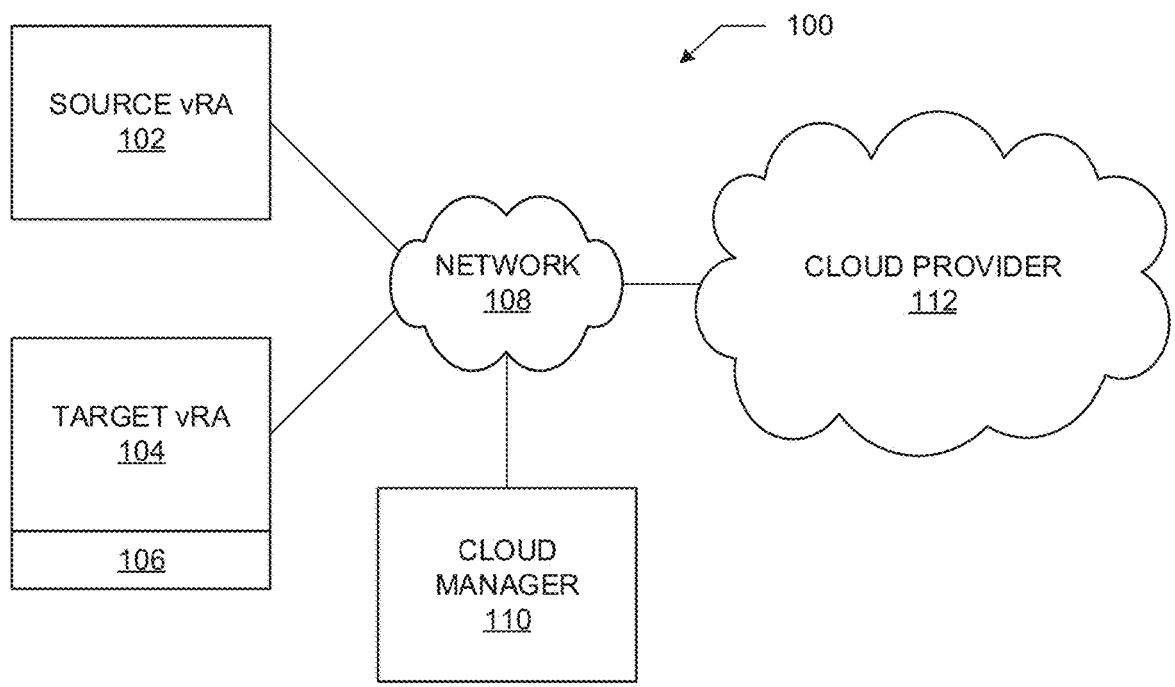
FIG. 1 depicts an example system constructed in accordance with the teachings of this disclosure for performing data migration in a distributed environment of a cloud computing platform.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

Cloud computing platforms may provide many powerful capabilities for performing computing operations. However, taking advantage of these computing capabilities manually may be complex and/or require significant training and/or expertise. Prior techniques to providing cloud computing platforms and services often require customers to understand details and configurations of hardware and software resources to establish and configure the cloud computing platform.

A virtual machine is a software computer that, like a physical computer, runs an operating system and/or applications. An operating system installed on a virtual machine is referred to as a guest operating system. Because each virtual machine is an isolated computing environment, virtual machines (VMs) can be used as desktop or workstation environments, as server environments, as testing environments, to consolidate server applications, etc. Virtual machines can run on hosts or clusters. The same host can run a plurality of VMs, for example.

Example Virtualization Environments

Many different types of virtualization environments exist. Three example types of virtualization environment are: full virtualization, paravirtualization, and operating system virtualization. Full virtualization is a virtualization environment in which hardware resources are managed by a hypervisor to provide virtual hardware resources to a virtual machine. In a full virtualization environment, the virtual machines do not have direct access to the underlying hardware resources. Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. Operating system virtualization is also referred to herein as container virtualization. As used herein, operating system virtualization refers to a system in which processes are isolated in an operating system. In a typical operating system virtualization system, a host operating system is installed on the server hardware. In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

Examples disclosed herein provide data migration from a first environment (e.g., a live system) to a second environment. For example, a migration may occur when a user wants to upgrade from a first version of management cloud-based infrastructures to a second (e.g., newer) version of management cloud-based infrastructures. Examples disclosed herein gathers data from one or more source database(s) and/or source components (e.g., Windows and/or Linux-based components) from a source environment in a migration package and downloads and extracts the migration package in a target environment. Because of various differences between the source environment and the target environment, some of the data and/or components of the source environment are not compatible with the operation of the target environment. Accordingly, examples disclosed herein decrypt and re-encrypt the source data and perform various schema upgrades so that the data corresponding to the migration package is properly installed for use in the target environment. Examples disclosed herein significantly reduce the amount of time to upgrade from a first environment to a second environment by upgrading data and/or components on a component-by-component basis.

FIG. 1 depicts an example system 100 constructed in accordance with the teachings of this disclosure for performing data migration in a distributed environment (e.g., system) of a cloud computing platform. The example system 100 includes a first example vRealize Automation™ environment (source vRA) 102, a second example vRealize Automation™ environment (target vRA) 104, an example environment migrator 106, an example network 108, an example cloud manager 110, and an example cloud provider 112. As described herein, the example system 100 facilitates management of the example cloud provider 112 and does not include the example cloud provider 112. Alternatively, the system 100 could be included in the cloud provider 112.

The example source vRA 102 and the example target vRA 104 of FIG. 1 are distributed systems (e.g., environments and/or servers) that enables IT Automation by delivering cloud-based infrastructure and application resources based on user demand. For example, the source vRA 102 and/or the target vRA 104 include a user interface to provide a user (e.g., an administrator) the ability to provision and configure storage, network, and computer resources across multiple private and hybrid cloud platforms. In some examples, the source vRA 102 and/or the target vRA 104 include a IaaS component (e.g., node) to create and manage multi-machine blueprints and reclaim unused cloud resources and/or other resources. For example, the IaaS component of the example source vRA 102 or the example target vRA 104 may create and manage a multi-machine blueprint including definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine and/or container). In the illustrated system 100, source vRA 102 is a first system (e.g., environment) and target vRA 104 is a second system different than the first system (e.g., a new version). For example, source vRA 102 may be vRealize Automation 6.2 and target vRA 104 may be vRealize Automation 7.1. In such an example, a user may desire to update the system 100 to operate using the newer system target vRA 104. Examples disclosed herein provide a side-by-side upgrade from the example source vRA 102 to the example target vRA 104 using migration, thereby allowing data from source vRA 102 appearing in the target vRA 104 environment for immediate use.

The example target vRA 104 of FIG. 1 includes the example environment migrator 106. The example environment migrator 106 orchestrates the migration of data from the example source vRA 102 to the example target vRA 104. The example environment migrator 106 includes a user interface to receive instructions from a user. Such instructions may include details related to a migration from the example source vRA 102 to the example target vRA 104. The example environment migrator 106 transforms data from the example source vRA 102 to the example target vRA 104, performs schema updates to the various components of source vRA 102 so that such components are operable under the example target vRA 104, re-encrypts a database (e.g., a structure query language (SQL) database and/or an IaaS database) corresponding to the source vRA 102 and passwords associated with the source vRA 10, etc. The example environment migrator 106 is further described below in conjunction with FIG. 2. Although the example system 100 includes the example environment migrator 106 within the example target vRA 104, the example environment migrator 106 may be located within any of the components of the example system 100 or may be its own stand-alone device.

Although the example vRAs 102, 104 of FIG. 1 refer to the vRealize Automation™ environment, the example vRAs 102, 104 may be used with any type of cloud management automater. A cloud management automater provides tools, resources, and/or administrators for management operations. Such management operations may include, but are not limited to provisioning and configuring storage (e.g., cloud based storage), configuring storage, network, and/or compute resources across multiple private and hybrid cloud platforms, automating application delivery, simplifying deployment of mutli-tiered applications while managing multi-vender and multi-cloud infrastructures, etc.

The example network 108 of FIG. 1 couples the example source vRA 102, the example target vRA 104, the example environment migrator 106, the example cloud manager 110, and/or the example cloud provider 112 via a wired or wireless connection. The example network 108 may be implemented using any type of public or private network such as, but not limited to, the Internet, a telephone network, a local area network (LAN), a cable network, and/or a wireless network. To enable communication via the network 108, each of the example source vRA 102, the example target vRA 104, the example environment migrator 106, the example cloud manager 110, and/or the example cloud provider 112 may include a communication interface that enables a connection to an Ethernet, a digital subscriber line (DSL), a telephone line, a coaxial cable, or any wireless connection, etc.

The example cloud manager 110 of FIG. 1 interacts with the components of the system 100 (e.g., the example source vRA 102, the example target vRA 104, and/or the example cloud provider 112) to facilitate the management of the resources of the cloud provider 112. The example cloud manager 110 may facilitate the creation and management of multi-machine blueprints and reclaim unused cloud resources. The cloud manager 110 may additionally include other components for managing a cloud environment. The cloud manager 110 facilitates more efficient management of multiple virtual machines and/or containers than manually managing (e.g., deploying) basic blueprints individually. The example cloud manager 110 of the illustrated example facilitates recovery of cloud computing resources of the cloud provider 112 that are no longer being activity utilized. Automated reclamation may include identification, verification and/or reclamation of unused, underutilized, etc. resources to improve the efficiency of the running cloud infrastructure.

The example cloud computing platform provider 112 of FIG. 1 provisions virtual computing resources (e.g., virtual machines, or "VMs,", or containers) that may be accessed by users of the cloud computing platform 110 (e.g., users associated with an administrator and/or a developer) and/or other programs, software, device. etc. Example containers are software constructs that run on top of a host operating system without the need for a hypervisor or a separate guest operating system. Unlike virtual machines, the containers do not instantiate their own operating systems. Like virtual machines, the containers are logically separate from one another. The example VMs and/or containers provide different functions within an application (e.g., services, portions of the application, etc.). One or more of the VMs and/or containers are customized by an administrator and/or a developer of the application relative to a stock or out-of-the-box (e.g., commonly available purchased copy) version of the services and/or application components. Additionally, the services executing on the example VMs and/or containers may have dependencies on other ones of the VMs and/or containers. The example cloud computing platform provider 112 may provide multiple deployment environments, for example, for development, testing, staging, and/or production of applications. The administrator, the developer, other programs, and/or other devices may access services from the cloud computing platform provider 112, for example, via REST (Representational State Transfer) APIs (Application Programming Interface) and/or via any other client-server communication protocol. Example implementations of a REST API for cloud computing services include a vCloud Administrator Center™ (vCAC) and/or the example source vRA 102 and/or the example target vRA 104 and a vCloud Director™ API available from VMware, Inc. The example cloud computing platform provider 112 provisions virtual computing resources (e.g., the VMs and/or containers) to provide the deployment environments in which the administrator and/or the developer can deploy multi-tier application(s). One particular example implementation of a deployment environment that may be used to implement the deployment environments of FIG. 1 is vCloud DataCenter cloud computing services available from VMware, Inc.

In operation, the example cloud manager 110 and the example cloud provider 112 operate under the example source vRA 102 environment. When the example environment migrator 106 initiates a migration from the example source vRA 102 environment to the example target vRA 104 environment, the example environment migrator 106 backs-up one or more databases corresponding to the example source vRA 102 environment and generates a migration package including the backed-up database. In some examples, the migration package further includes passwords, encryption data, email templates, component data, and/or any other data related to the example source vRA 102. The example environment migrator 106 applies the database data to one or more database(s) corresponding to the example target vRA 104 environment. Additionally, the environment migrator 106 facilitates migration to the example target vRA 104 by re-encrypting encrypted data and facilitating database schema and component upgrades so that the features corresponding to the source vRA 102 are consumable in the target vRA 104 as if the features have always corresponded to the example target vRA 104, as further described below.

Figure 2:
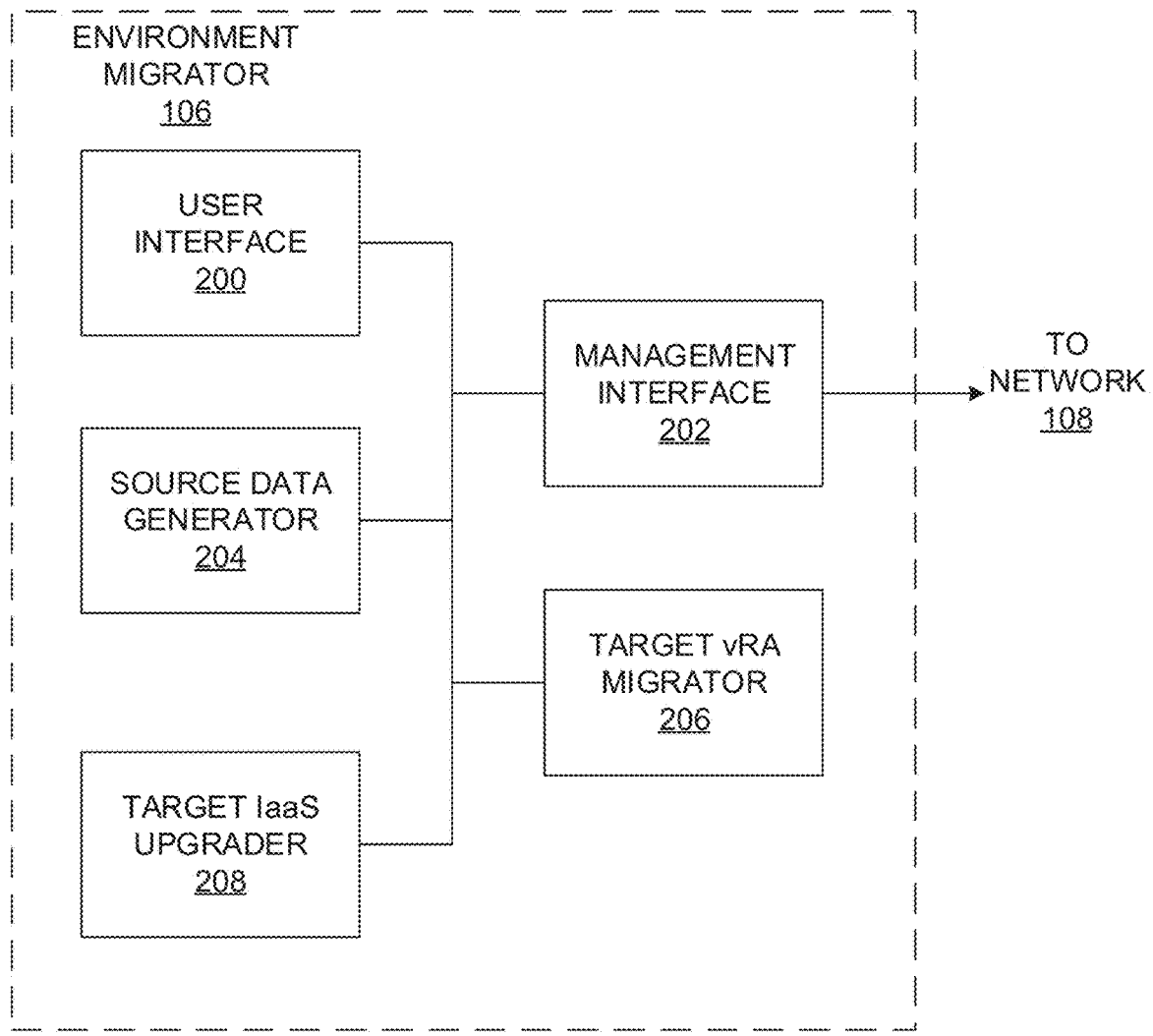
FIG. 2 illustrates an example implementation of the environment migrator of FIG. 1 to facilitate migration of data from a first environment to a second environment.

FIG. 2 illustrates an example implementation of the example environment migrator 106 of FIG. 1 to migrate data from a first environment (e.g., the example source vRA 102 of FIG. 1) to a second environment (e.g., the example target vRA 104 of FIG. 1). In the illustrated example of FIG. 2, the example environment migrator 106 includes an example user interface 200, an example management interface 202, an example source data generator 204, an example target vRA migrator 206, and an example target IaaS upgrader 208.

The example user interface 200 of FIG. 2 receives instructions from a user. The user interface 200 provides an interface for a user to request provisioning of a different preset environments. The user interacts with the user interface 200 to complete a questionnaire and provide firewall access to the cloud provider 112 without customer involvement. Thus, for example, a user may use a Microsoft Windows® machine to manage environment migrations. To the user, it appears that he or she is working on a single machine, but behind the scenes, the system 100 is accessing a plurality of different servers depending upon what functionality is to be executed. The example management interface 202 communicates with the example source vRA 102, components of the example target vRA 104, the example cloud manager 110, and/or the example cloud provider 112 to facilitate a migration from source vRA 102 to target vRA 104. In some examples, the example management interface 202 may communicate with the example source vRA 102 via the example network 108.

The example source data generator 204 of FIG. 2 communicates with the example source vRA 102 to gather data (e.g., source data) corresponding to the example source vRA 102 (e.g., the source environment). In some examples, the source data generator 204 gathers the source data by instructing the example source vRA 102 to stop services, generate and export a migration package, and restart services after the migration package has been sent back to the example management interface 202. The migration package is package of data that includes the data of the source vRA 102 to be downloaded by the target vRA 104. For example, the migration package may be a bundle (BND) file, a ZIP file, an extensible markup language (XML) file, etc. The migration package may include any database data (e.g., vRA database data and/or vRealize Orchestrator (vRO) database data), passwords, encryption data, email templates, component data, and/or any other data related to the example source vRA 102. In some examples, the source vRA 102 includes an orchestrator (e.g., a development and/or process automation platform) to provide a library of extensible workflows to allow a user to create and run automated processed to manage infrastructures (e.g., vSphere) as well as other third-party technologies. The example orchestrator includes a database with data corresponding to the orchestrator. Accordingly, when the example source vRA 102 includes a vRO, the migration package will include data stored in the example vRO database. The example migration package is forwarded to the example target vRA migrator 206.

The example target vRA migrator 206 of FIG. 2 gathers (e.g., downloads and extracts) the migration package to initiate the migration of the source vRA 102 to the target vRA 104. The example target vRA migrator 206 instructs the example target vRA 104 to stop services, restore the vRA and/or vRA database(s) based on the data of the migration package, upgrade the database scheme(s) of the vRA and/or vRO database(s), re-encrypt the database(s) and passwords of the migration package, and/or import any other data corresponding to the migration package. Additionally, the example target vRA migrator 206 may reset an event bus of the target vRA (e.g., the example target vRA 104), reset administrator passwords of the example target vRA 104, and/or upgrade identify management services at the example target vRA 104. Once the migration is complete, the example target vRA migrator 206 instructs the example target vRA 104 to restart services.

The example target IaaS upgrader 208 upgrades the IaaS component (e.g., node) in the target environment (e.g., the example target vRA 104) so that the example IaaS component is configured to operate using the migrated data of the example target vRA 104. The example target IaaS upgrader 208 upgrades the IaaS of the example target vRA 104 by stopping the service, backing up the configurations of the target IaaS component, upgrading the database schema of an IaaS database, upgrading connection strings, re-encrypting the IaaS database, upgrading the repository model (e.g., the Windows components of target vRA 104 and/or the cloud provider 112), upgrade the repository content so that it is compatible with the data of the migrated data in the example target vRA 104, and migrate legacy data to the Linux components of the example cloud provider 112. The example target IaaS upgrader 208 determines which components are to be upgraded and which components are not to be upgraded based on the requirements and/or characteristics of the target environment (e.g., some components associated with the source environment can be run in the target environment without an upgrade and other components associated with the source environment cannot be run in the target environment without a component upgrade). In this manner, components from the source environment can be upgraded on a case-by-case basis to function in the target environment. Once the migration is complete, the example target IaaS upgrader 208 restarts the services of the IaaS component in the target environment.

Figure 3:
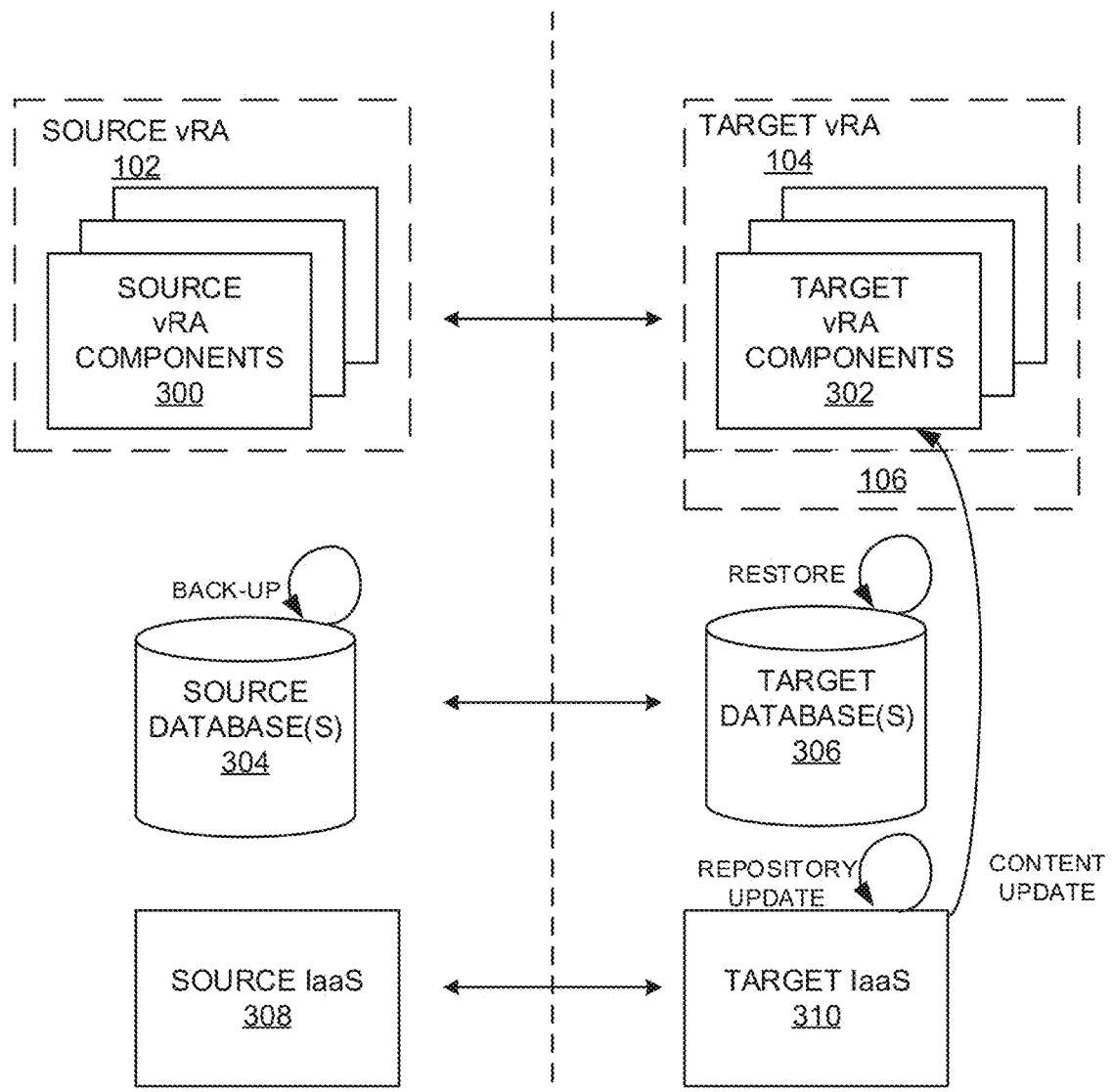
FIG. 3 illustrates an example data migration from a first example environment to a second example environment.

FIG. 3 illustrates an example data migration from a first example environment (e.g., the example source vRA 102) to a second example environment (e.g., the example target vRA 104) via instructions from the example environment migrator 106. The illustration of FIG. 3 includes example source vRA components 300, example target vRA components 302, an example source database(s) 304, an example target database(s) 306, an example source IaaS 308, and an example target IaaS 310. The example source vRA components 300, the example source database(s) 304, and the example source IaaS 308 correspond to the first environment (e.g., the example source vRA 102). The example target vRA components 302, the example target database(s) 306, and the example target IaaS 310 corresponds to a second environment (e.g., the example target vRA 104).

The example source vRA components 300 of FIG. 3 and the example target vRA components 302 of FIG. 3 are vRA components (e.g., service components or service appliances). Some of the example vRA components 300, 302 may be distributed as appliances others may be installed on Windows. Some of the vRA components 300, 302 are Linux-based microservices that include upgrading features to upgrade during a migration (e.g., in order to function in the example target vRA 104 environment), while others are not to be upgraded and are migrated as in from the example source vRA 102 to the example target vRA 104. Such components may include, for example, a service provider, an orchestrator, an event broker, an authentication provider, etc. The example vRA components 300, 302 may be included in virtual appliances in the example cloud provider 112 of FIG. 1.

The example source database(s) 304 and the example target database(s) 306 of FIG. 3 storage data for the example vRA components 300, 302, the example IaaSs 308, 310, and/or more generally the example environments (e.g., source vRA 102 and/or target vRA 104). In some examples, the source database(s) 304 and/or the target database(s) 306 may be implemented by multiple databases. For example, there may be a first source database and a first target database corresponding to components of the example source IaaS 208 and/or the example target IaaS 310, respectively, and a second source database and a second target database corresponding to components of the example source vRA components 300 and/or the example target vRA components 302, respectively. During a migration from the example source vRA 102 to the example target vRA 104, the example source database(s) 304 generates a back-up of the stored data and includes the back-up data into a migration package to transmit to the example target database(s) 306. Once the example target database(s) 306 receives the migration package, the example target database(s) 306 downloads and stores the backed-up data. The example source database(s) 304 and/or the example target database(s) 306 may be included in a management stack or a provider's managed SQL cluster with the example cloud manager 110 and/or the example cloud provider 112 of FIG. 1.

The example source IaaS 308 and/or the example target IaaS 310 of FIG. 3 provisions one or more VMs and/or containers for a customer using blueprints via a virtual appliance in the example cloud provider 112. During a migration, data related to the example source IaaS 308 is received and the example target IaaS 310 performs various functions to ensure that the target blocks 302, 306, and 310 are able to function with the migrated data in the example target vRA 104 environment based on the instructions from the example environment migrator 106. For example, the environment migrator 106 may instruct the target IaaS 310 to stop services, configure backup configurations, update IaaS database schema(s), upgrade connection strings, re-encrypt the IaaS database, upgrade repository models, upgrade repository content (e.g., of the example target vRA components 302), and/or migrate legacy data to the example target vRA components 302. Once the migration is complete, the example target IaaS 310 re-starts services to run in the example target vRA 104 environment with the migrated data corresponding to the example source vRA 102 environment. Although the example source IaaS 308 and the example target IaaS 310 are illustrated as separate components, either one of the source IaaS 308 may be included in the example source vRA 102 and/or the target IaaS 310 may be included in the example target vRA 104.

While an example manner of implementing the example environment migrator 106 of FIG. 1 is illustrated in FIG. 2, one or more of the elements, processes and/or devices illustrated in FIG. 2 may be combined, divided, re-arranged, omitted, eliminated and/or implemented in any other way. Further, the example user interface 200, the example management interface 202, the example source data generator 204, the example target vRA migrator 206, the example target IaaS upgrader 208, and/or, more generally, the example environment migrator 106 of FIG. 2 may be implemented by hardware, software, firmware and/or any combination of hardware, software and/or firmware. Thus, for example, any of the example user interface 200, the example management interface 202, the example source data generator 204, the example target vRA migrator 206, the example target IaaS upgrader 208, and/or, more generally, the example environment migrator 106 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user interface 200, the example management interface 202, the example source data generator 204, the example target vRA migrator 206, the example target IaaS upgrader 208, and/or, more generally, the example environment migrator 106 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example user interface 200, the example management interface 202, the example source data generator 204, the example target vRA migrator 206, the example target IaaS upgrader 208, and/or, more generally, the example environment migrator 106 of FIG. 2 may include one or more elements, processes and/or devices in addition to, or instead of, those illustrated in FIG. 10, and/or may include more than one of any or all of the illustrated elements, processes, and devices.

Figure 4A:
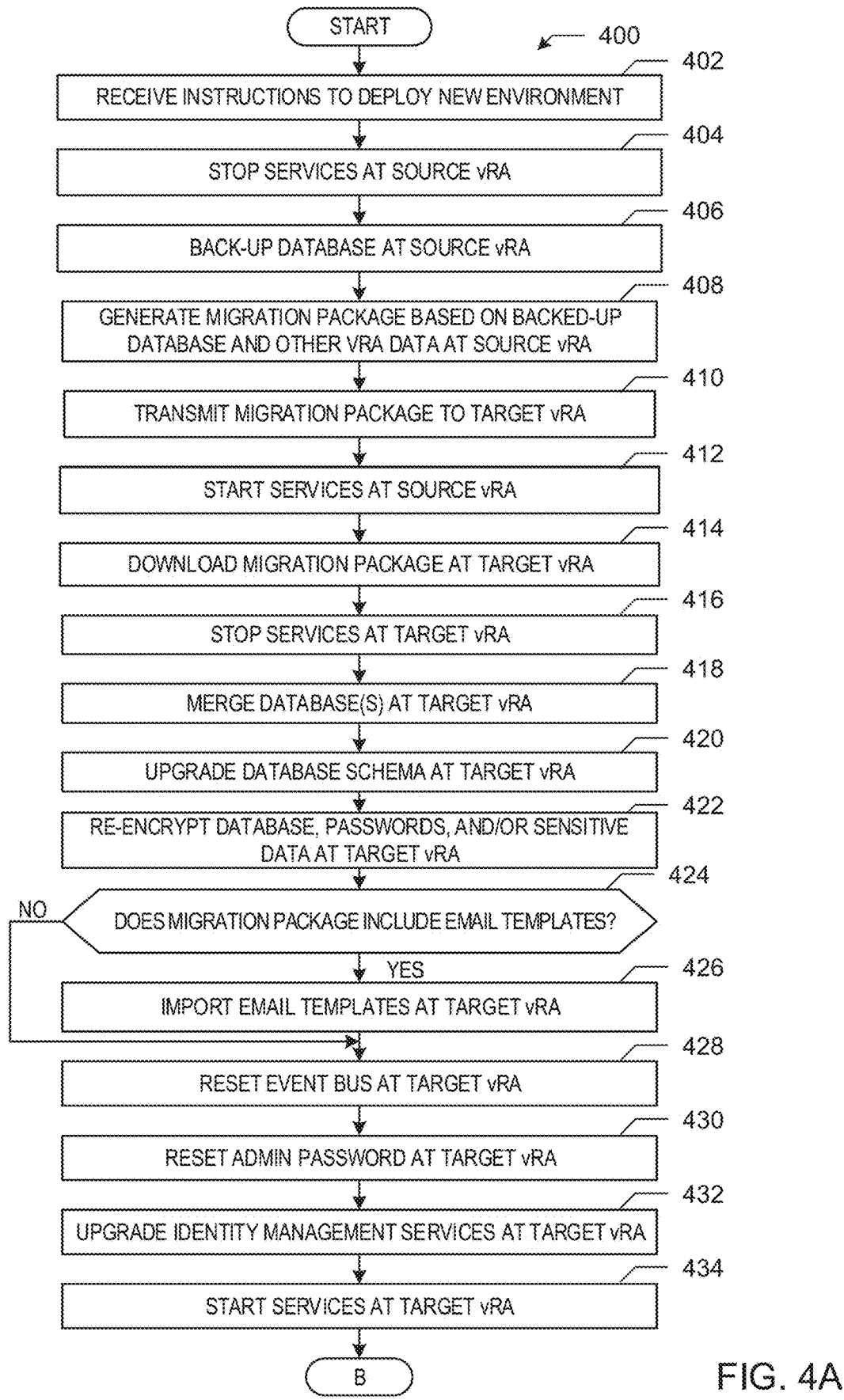
FIGS. 4A-4B depict a flowchart representative of computer readable instructions that may be executed to implement the environment migrator of FIGS. 1 and/or 2.
Figure 4B:
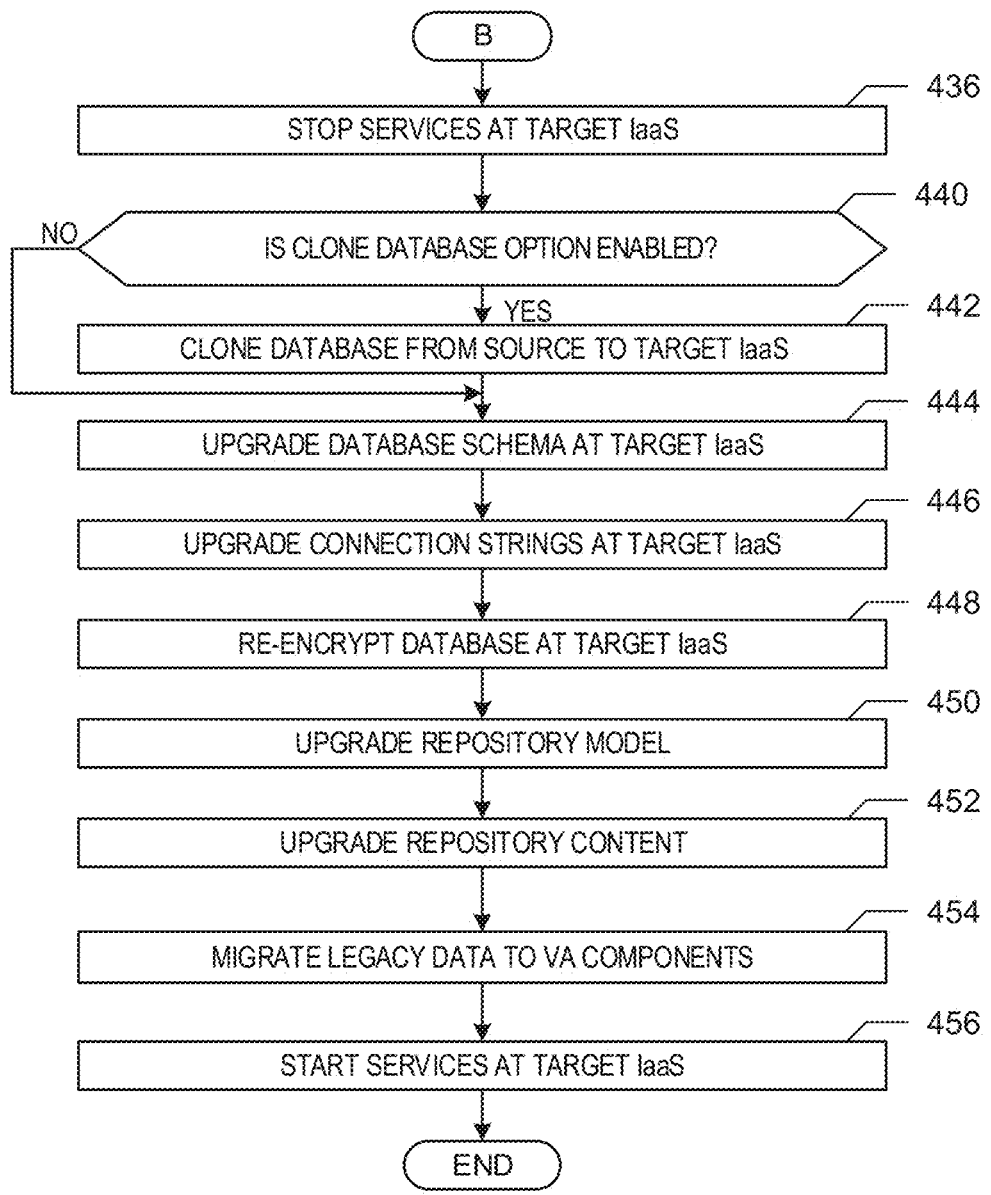

Flowcharts representative of example machine readable instructions for implementing the example user interface 200, the example management interface 202, the example source data generator 204, the example target vRA migrator 206, the example target IaaS upgrader 208, and/or, more generally, the example environment migrator 106 of FIG. 2 are shown in FIGS. 4A-4B. In these examples, the machine readable instructions comprise a program for execution by a processor such as the processor 512 shown in the example processor platform 500 discussed below in connection with FIG. 5. The program may be embodied in software stored on a non-transitory computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowcharts illustrated in FIGS. 4A-4B, many other methods of deploying, evaluating, and installing services on component servers in accordance with the teachings of this disclosure may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 4A-4B the example processes of FIGS. 4A-4B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIGS. 4A-4B depicts an example flowchart 400 representative of computer readable instructions that may be executed to implement the example environment migrator 106 to migrate from a first environment (e.g., the example source vRA 102) to a second environment (e.g., the example target vRA 104). Although the flowchart 400 of FIGS. 4A-4B is described in conjunction with the example environment migrator 106 in the example system 100 of FIG. 1, the process may be implemented using any type of environment migrator in any type of cloud system.

Initially, at block 402, the example user interface 200 receives instructions to deploy a new environment (e.g., a migration from the example source vRA 102 to the example target vRA 104 of FIG. 1). At block 404, the example source data generator stops services at the example source vRA 102. For example, the source data generator 204 may transmit instructions via the example management interface 202 to the example source vRA components 300 of FIG. 3 to stop running. At block 406, the example source data generator 204 backs-up the database at the example source vRA 102. For example, the source data generator 204 may transmit instructions to the example source database(s) 304 to back-up the stored data.

At block 408, the example source data generator 204 generates a migration package based on the backed-up database and other vRA data at the example source vRA 102. The other vRA data may include passwords, encryption keys, email templates, and/or any other data related to the source vRA. In some examples, the source data generator 204 provides the instructions to the example database to generate the example migration package. At block 410, the example management interface 202 instructs the example source vRA 102 to transmit the migration package to the target vRA (e.g., the example target vRA 104). At block 412, the example source data generator 204 instructs the example source vRA 102 to starts services.

At block 414, the example target vRA migrator 206 downloads the migration package at the example target vRA 104. At block 416, the example target vRA migrator 206 stops the services at the example target vRA 104 (e.g., including the services of the target vRA components 302 and/or any virtual appliance components corresponding to the target vRA 104). At block 418, the example target vRA migrator 206 merges the database(s) at the example target vRA 104 by restoring the source database in the target database (e.g., the example target database(s) 306). For example, the example target database(s) 306 of FIG. 3 restores to include the data from the example source database(s) 304. In this manner, the data from the source database(s) 304 is readily available for use in the example target vRA 104. At block 420, the example target vRA migrator 206 upgrades the database schema at the target vRA 104. The example target vRA migrator 206 upgrades the database schema so that the data in the database is operable in the target vRA 104.

At block 422, the example target vRA migrator 206 re-encrypts the target database(s) (e.g., the example target database(s) 306), passwords, and/or any other sensitive data at the example target vRA 104. The example target vRA migrator 206 re-encrypts the target database, passwords, and/or other sensitive data by decrypting the encrypted data and re-encrypting the data using an encryption key so that the re-encrypted data is fully supported by the example target vRA 104. At block 424, the example target vRA migrator 206 determines if the migration package includes one or more email templates. If the example target vRA migrator 206 determines that the migration package includes one or more email templates (block 426: YES), the example target vRA migrator 206 imports the email templates at the example target vRA 104 (block 426).

At block 428, the example target vRA migrator 206 resets the event bus at the target vRA 104 to remove accumulated messages that are no long relevant. At block 430, the example target vRA migrator 206 resets an administrator password at the example target vRA 104 so that the administrator password associated with the example source vRA 102 can be implemented by the example target vRA 104. At block 432, the example target vRA migrator 206 upgrades the identity management services at the target vRA 104. Such an upgrade may include, for example, migrating a first identity management service (e.g. single sign-on (SSO)) to a second identity management service (e.g., virtual identify manager (vIDM)). At block 434, the example target vRA migrator 206 starts the services at the example target vRA 104.

At block 436, the example target IaaS upgrader 208 stops the services at the example target IaaS 310 of the example target vRA 104. At block 440, the example target IaaS upgrader 208 determines if the clone database option is enabled. A user may enable and/or disable the clone database option via the example user interface 200. If the example target IaaS upgrader 208 determines that the clone database option is enabled (block 440: YES), then the example target IaaS upgrader 208 clones the database from the example source IaaS 308 to the example target IaaS 310 (block 442).

At block 444, the example target IaaS upgrader 208 upgrades the database schema at the target IaaS 310 (e.g., corresponding to the components of the target IaaS 310) so that the database corresponding to the source IaaS 308 is operable by the example target IaaS 310. At block 446, the example target IaaS upgrader 208 upgrades the connection strings at the example target IaaS 310 to ensure that the connection strings of the source IaaS 308 are usable by the example target IaaS 310. The connection strings are used to secure connections, thereby securing host access. At block 448, the example target IaaS upgrader 208 re-encrypts the database at the example target IaaS 310. The example target IaaS upgrader 208 re-encrypts the database by decrypting the encrypted database of the source IaaS 308 and re-encrypting the data using an encryption key so that the re-encrypted data is fully supported by the example target IaaS 310.

At block 450, the example target IaaS upgrader 208 upgrades the repository models so that the target IaaS 310 is capable of operating the target vRA components 302 of FIG. 3. As explained above, some of the components work in the example target vRA 104 without an upgrade. Accordingly, the target IaaS upgrader 208 upgrades the repository model by determining which components are to be upgraded and which components are not to be upgraded based on the data in the migration package. At block 452, the example target IaaS upgrader 208 upgrades the repository content of the components that are to be upgraded. Upgrading the content may include upgrading the example target vRA components 302 (e.g., the Windows-based components) to correspond to the source vRA components 300 of FIG. 3, thereby allowing the source vRA components 300 to be operable in the target vRA 104. At block 454, the example target IaaS upgrader 208 migrates the legacy data to the example target vRA components 302 (e.g., the Linux-based components). After migration is complete, the example target IaaS upgrader 208 starts the services at the example target IaaS 310 (block 456).

Figure 5:
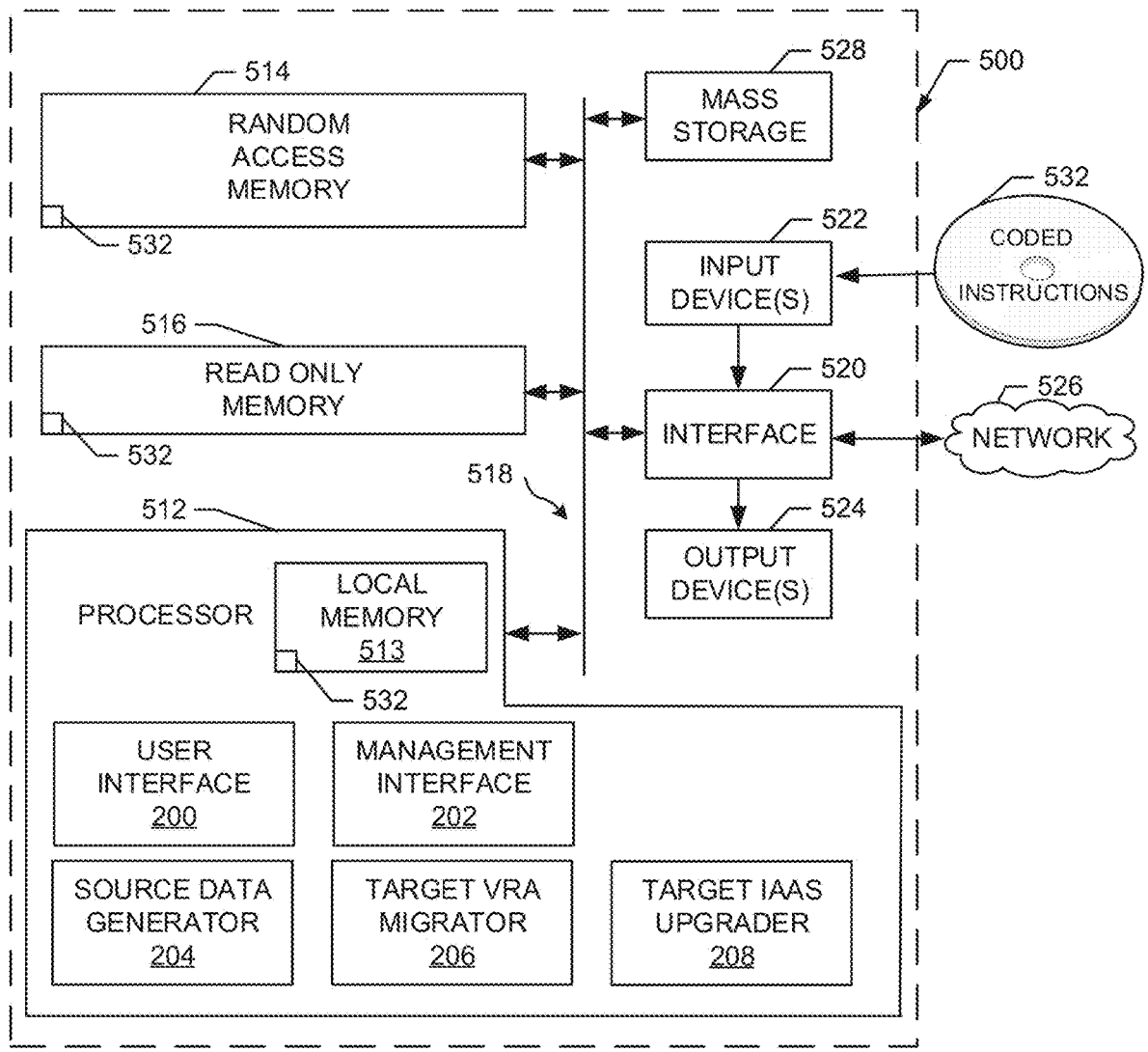
FIG. 5 is a block diagram of an example processing platform capable of executing the example machine-readable instructions of FIGS. 4A-4B to implement the environment migrator of FIGS. 1 and/or 2.

FIG. 5 is a block diagram of an example processor platform 500 capable of executing the instructions of FIGS. 4A-4B to implement the example systems, operation, and management of FIGS. 1-3. The processor platform 500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer. The hardware may be a semiconductor based (e.g., silicon based) device. In this example, the processor implements the example environment migrator 106, or portions thereof, such as the example user interface 200, the example management interface 202, the example source data generator 204, the example target vRA migrator 206, the example target IaaS upgrader 208.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include flash devices, floppy disk drives, hard drive disks, optical compact disk (CD) drives, optical Blu-ray disk drives, RAID systems, and optical digital versatile disk (DVD) drives.

Coded instructions 532 representative of the example machine readable instructions of FIGS. 8-9 may be stored in the mass storage device 528, in the volatile memory 514, in the non-volatile memory 516, and/or on a removable tangible computer readable storage medium such as a CD or DVD.

From the foregoing, it will be appreciated that the above disclosed methods, apparatus and articles of manufacture perform data migration in a distributed environment. Examples disclosed herein include merging a source database into a target database, performing schema upgrades, and upgrading the content of the vRA components so that data in a database of a source vRA can operate in a target vRA. Traditional techniques for upgrading from one environment to another environment include an in-place upgrade which requires stopping all services of an environment and performing upgrades to all the components and all the data in the source database to satisfy target environment standards, which can take up to days to complete. Examples disclosed herein perform a data migration from a live system, where data and components may be copied directly from the source vRA to a target vRA and data and/or components may be upgraded on a component-by-component basis. In this manner, data and/or components that are not to be updated to function within the target vRA are left alone while other components are moved over and then updated to meet the target vRA requirements. Using examples disclosed herein, the time and effort required to upgrade from a first environment to a second environment is substantially reduced from days to hours by migrating the data in from a live system. Additionally, examples disclosed herein reduces the risk of traditional techniques because rollback of the source system is not needed if migration fails. Additionally, examples disclosed herein enables a user the ability to try out new versions of a vRA without impacting production operations.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   processor circuitry;
   a source data generator to generate a migration package corresponding to a source cloud management automater, the source cloud management automater being a first management environment;
   a target cloud management automater migrator to:
      migrate data of the migration package into a target cloud management automater, the target cloud management automater being a second management environment;
      merge a source database and a target database at the target cloud management automater, the target database storing data for the target cloud management automater, the merge including restoring the source database into the target database, the source database formed by the source data generator; and
      perform a schema upgrade of the target database; and
   a target service upgrader to upgrade service components at the target cloud management automater based on the migration package, at least one of the source data generator, the target cloud management automater migrator, or the target service upgrader being implemented via the processor circuitry.

2. An apparatus as defined in claim 1, wherein the migration package includes at least one of source database data from the source cloud management automater, a password, encryption data, an email template, or source component data.

3. An apparatus as defined in claim 2, wherein the target cloud management automater migrator is to re-encrypt at least one of the source database data, the password, or private data.

4. An apparatus as defined in claim 1, wherein the target service upgrader is to perform a second database schema upgrade on a second database at a target Internet as a service (IaaS) component.

5. An apparatus as defined in claim 4, wherein the target service upgrader is to re-encrypt the second database at the target IaaS component.

6. An apparatus as defined in claim 1, wherein the service components include Windows-based components and Linux-based components.

7. An apparatus as defined in claim 1, wherein the target service upgrader is to determine if a service component corresponding to the source cloud management automater is to be upgraded based on requirements of the target cloud management automater.

8. A method comprising:
   generating a migration package corresponding to a source cloud management automater, the source cloud management automater being a first management environment;
   migrating data of the migration package into a target cloud management automater, the target cloud management automater being a second management environment;
   merging a source database and a target database at the target cloud management automater, the target database storing data for the target cloud management automater, the merging including restoring the source database into the target database, the source database formed by a source data generator;
   performing a schema upgrade of the target database; and
   upgrading service components at the target cloud management automater based on the migration package.

9. A method as defined in claim 8, wherein the migration package includes at least one of source database data from the source cloud management automater, a password, encryption data, an email template, or source component data.

10. A method as defined in claim 9, further including re-encrypting at least one of the source database data, the password, or private data.

11. A method as defined in claim 8, further including performing a second database schema upgrade on a second database at a target Internet as a service (IaaS) component.

12. A method as defined in claim 11, further including re-encrypting the second database at the target IaaS component.

13. A method as defined in claim 8, wherein the service components include Windows-based components and Linux-based components.

14. A method as defined in claim 8, further including determining if a service component corresponding to the source cloud management automater is to be upgraded based on requirements of the target cloud management automater.

15. A non-transitory computer readable storage medium comprising instructions which, when executed, cause a machine to at least:
generate a migration package corresponding to a source cloud management automater, the source cloud management automater being a first management environment;
migrate data of the migration package into a target cloud management automater, the target cloud management automater being a second management environment;
merge a source database and a target database at the target cloud management automater, the target database storing data for the target cloud management automater, the merge including restoring the source database into the target database, the source database formed by a source data generator;
perform a schema upgrade of the target database; and
upgrade service components at the target cloud management automater based on the migration package.

16. A computer readable medium as defined in claim 15, wherein the migration package includes at least one of source database data from the source cloud management automater, a password, encryption data, an email template, or source component data.

17. A computer readable medium as defined in claim 16, wherein the instructions cause the machine to re-encrypt at least one of the source database data, the password, or private data.

18. A computer readable medium as defined in claim 15, wherein the instructions cause the machine to perform a second database schema upgrade on a second database at a target Internet as a service (IaaS) component.

19. A computer readable medium as defined in claim 18, wherein the instructions cause the machine to re-encrypt the second database at the target IaaS component.

20. A computer readable medium as defined in claim 15, wherein the service components include Windows-based components and Linux-based components.

21. A computer readable medium as defined in claim 15, further including instructions to cause the machine to determine if a service component corresponding to the source cloud management automater is to be upgraded based on requirements of the target cloud management automater.

* * * * *